3,297,650
POLYETHYLENE TEREPHTHALATE
PRODUCTION
Gabor Halmi, Frankfurt am Main, Germany, and Ram Advani, Bombay, India, assignors to Hans J. Zimmer Verfahrenstechnik, Frankfurt am Main, Germany
No Drawing. Filed Mar. 18, 1963, Ser. No. 266,044
Claims priority, application Germany, Mar. 23, 1962
Z 9,325
5 Claims. (Cl. 260—75)

It is known to use catalysts in the production of polyesters from dimethyl terephathalate by transesterification with ethylene glycol to form diethylene glycol terephthalate and subsequent polycondensation to form a polyester. Metal salts of lower aliphatic carboxylic acids such as formic acid or acetic acid are used as catalysts in most cases. Thus, U.S. Patent No. 2,641,592 discloses the use of cobalt acetate, U.S. Patent 2,740,268 the use of basic Fe acetate, U.S. Patent 2,947,729 the use of lead acetate, British Patent 742,196 the use of manganese acetate, U.S. Patent 2,892,815 the use of tin formate, British Patent 773,778 the use of zinc acetate, U.S. Patent 2,989,499 the use of zinc salts of fatty acids, and British Patent 727,790 discloses the use of zirconium acetate as catalyst for the production of polyesters. The publications by W. Griehl and G. Schnock ("Zur Katalyse der Polyester-Bildung durch Esteraustausch," Faserforchung und Textiltechnik 8, 408 (1957), and by J. A. Somers 'Improving the Method of Polyester Production, Polymer Progress 1958, Series No. 2) gives a good summary of the use of various metal salt catalysts.

It is further known that these catalysts remain in the finished articles prepared from the polyester, e.g. in polyester fibers, and have a decisive influence on a number of characteristics of these products. The physical and mechanical characteristics, the textile properties and wearing quality as well as the service life of the fiber and its stability to heat and light are greatly influenced by the catalysts used for its preparation. The color and affinity to dyes are also largely affected by the catalysts. It is known, for example, that Fe salts are generally excellent catalysts as regards the rate of reaction but have an unfavorable effect on color, stability to light and heat and on service life of the polymer.

It has now been found that, in the production of spinnable polyesters, especially polyethylene glycol terephthalate, by transesterification of dimethyl terephthalate with ethylene glycol and subsequent polycondensation, not only the metal cations but also the organic residues of the catalysts exert a decisive effect on the rate of reaction and the quality of the finished products. In accordance with the invention, the transesterification and polycondensation mentioned above are carried out with the addition of metal salts of aromatic hydroxycarboxylic acids as the catalysts. Particularly suitable compounds for the purposes of the invention are hydroxybenzophenone carboxylic acids and hydroxyacetophenone carboxylic acids. Suitable metal cations which may be used with advantage are calcium, barium, cadmium, cobalt, lead, manganese, tin, zinc, and chromium salts of the aromatic hydroxycarboxylic acids mentioned above. Thus, the zinc salt of salicoyl-salicylic acid, the manganese salt of 2-hydroxybenzophenone-6-carboxylic acid and the cobalt salt of 4-hydroxy-acetophenone-5-carboxylic acid have been found to be particularly favorable in the production of polyesters.

The catalysts mentioned above may also be used in mixture with each other. However, it is particularly advantageous to use hydroxydicarboxylic acid salts of the acids mentioned above wherein the two carboxyl groups are linked to different metal ions. The zinc-manganese salt of 2-hydroxy-benzophenone-3,6'-dicarboxylic acid and the cobalt-manganese salt of 4-hydroxy-acetophenone-3,6-dicarboxylic acid have been found to be particularly suitable.

The catalysts of the invention proved to be extremely satisfactory in the production of polyesters. They are readily soluble in both the starting materials and in the finished polymer and very high reaction rates are achieved by their addition. It further has been found that they also act as heat and light stabilizers due to the fact that the organic residues of the catalysts of the invention act also as radical traps for the radicals formed in oxidation processes. Moreover, the residues of the acids mentioned, due to their constitution, also function as ultraviolet filters. Insofar, the catalysts of the invention serve simultaneously as antioxidant and UV filter during the transesterification and polycondensation and also serve this function in the finished product, e.g. in the polyester fiber which is given improved protection from light and oxidation in use. The addition of the catalysts of the invention prevents yellowing of the polymers during their production and in use. The injection molding compositions, films or fibers are light to colorless-white.

The catalysts of the invention are added to the reaction mixture before the transesterification in amounts of 0.01 to 0.9% by weight and preferably 0.05 to 0.5% by weight, based on dimethyl terephthalate.

*Example*

1 mol dimethyl terephthalate was tranesterified with 2.2 mols glycol in the presence of 0.1% by weight (based on dimethyl terephthalate) of zinc-salicoyl-salicylate at temperatures of 190 to 220° C. and the excess glycol was removed. Thereafter the temperature is gradually increased to 200° C. and the pressure reduced to 0.1 to 5 mm. Hg. After a polycondensation period of about 3 hours, a polymer having $\eta_{intr.}=0.65$ to 0.75, measured in a 0.5% phenol-tetrachloroethane solution at 20° C., is obtained. The polymer is colorless-white and can be extruded to high quality fibers. These fibers, when subjected in dry state to temperatures up to 170° C. even for extended periods of time up to 16 hours or when irradiated with UV light up to 3000 hours, suffer a substantially lower loss of strength and elongation than do polyesters prepared with equivalent amounts of zinc formate or zinc acetate under the same conditions.

Comparable results were obtained with the addition of 0.09% by weight of manganese salt of 2-hydroxybenzophenone-6-carboxylic acid, 0.1% by weight of the cobalt salt of 4-hydroxyacetophenone-5-carboxylic acid and 0.07% by weight of the zinc-manganese salt of 2-hydroxy-benzophenone-3,6'-dicarboxylic acid.

What is claimed is:

1. In the process for the production of spinnable polyester polymers, which polyester polymers are produced by the transesterification of a dimethyl terephthalate with an ethylene glycol and the subsequent polycondensation of the transesterification product; the improvement which comprises catalyzing such polymer production with the salt of a metal selected from the group consisting of calcium, barium, cadmium, cobalt, lead, manganese, tin, zinc, and chromium, and a material selected from the group consisting of hydroxybenzophenone carboxylic acids and hydroxyacetophenone carboxylic acids.

2. The improved process claimed in claim 1, wherein said salt has two different metal ions linked to said carboxyl groups.

3. The improved process claimed in claim 1, wherein said salt is a zinc-manganese salt of 2-hydroxybenzophenone-3,6-dicarboxylic acid.

4. The improved process claimed in claim 1, wherein said salt is a cobalt-manganese salt of 4-hydroxyacetophenone-3,6-dicarboxylic acid.

5. The improved process claimed in claim 1, wherein said salt is present in a proportion of about 0.01 to 0.9 percent by weight based upon said dimethyl terephthalate.

References Cited by the Examiner
UNITED STATES PATENTS

| | | | |
|---|---|---|---|
| 2,933,475 | 4/1960 | Hoover et al. | 260—75 |
| 2,985,624 | 5/1961 | Arndt | 260—75 |
| 3,047,515 | 7/1962 | Piirma | 260—75 X |
| 3,057,826 | 10/1962 | Griffing | 260—75 |
| 3,126,360 | 3/1964 | Riehl | 260—75 |

SAMUEL H. BLECH, *Primary Examiner.*

LOUISE P. QUAST, WILLIAM H. SHORT, *Examiners.*